(12) United States Patent
Chen

(10) Patent No.: US 7,676,135 B2
(45) Date of Patent: Mar. 9, 2010

(54) FIBER PATCH PANEL

(75) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 11/748,737

(22) Filed: May 15, 2007

(65) Prior Publication Data

US 2008/0285932 A1 Nov. 20, 2008

(51) Int. Cl.
*G02B 6/00* (2006.01)
(52) U.S. Cl. .................... 385/135; 385/136; 385/137
(58) Field of Classification Search .................. 385/135
See application file for complete search history.

(56) References Cited

U.S. PATENT DOCUMENTS

| | | | | |
|---|---|---|---|---|
| 6,909,833 | B2 * | 6/2005 | Henschel et al. | 385/135 |
| 2001/0036351 | A1 * | 11/2001 | Fritz | 385/135 |
| 2004/0175089 | A1 * | 9/2004 | Dagley et al. | 385/135 |

* cited by examiner

*Primary Examiner*—Frank G Font
*Assistant Examiner*—Mary A El Shammaa

(57) ABSTRACT

A system may include a housing and a patch panel located within the housing. The patch panel may include a connection plate, and a matrix of fiber connectors connected to the connection plate and arranged to receive optical fibers in a vertical direction.

12 Claims, 9 Drawing Sheets

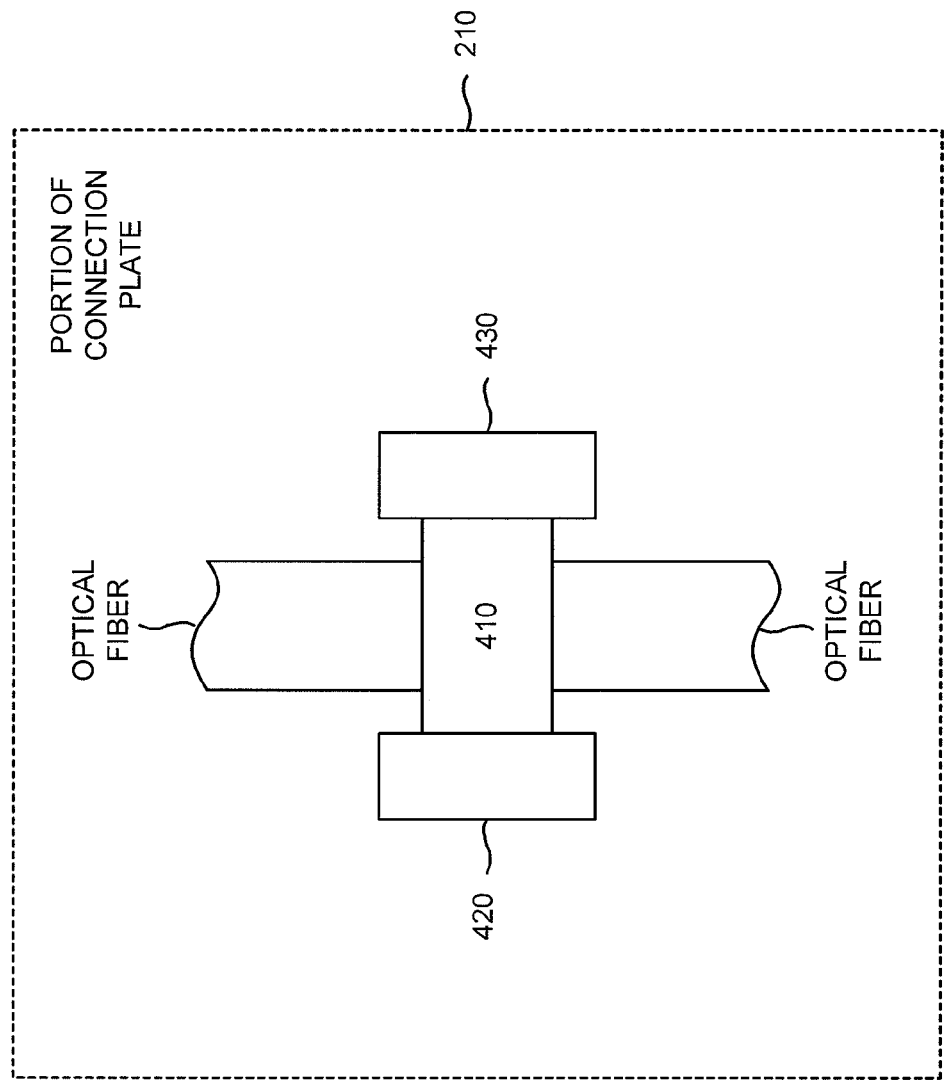

FIBER PATCH PANEL

BACKGROUND

A patch panel typically includes a panel of network ports that facilitate the interconnection of a number of cables. The patch panel permits connectors to be connected in a horizontal manner with connections in the front and back.

Existing patch panels have several problems. For example, existing patch panels are bulky (i.e., take a lot of space). Patch panels are typically placed in closets, where space is very limited. Also, the connectors connected to patch panels often get dirty and need to be cleaned. Existing patch panels make it easy to access the front connectors but very difficult to access the back connectors. Further, the horizontal nature of the patch panels promotes fiber bending, which leads to power loss and ultimately to signal degradation.

BRIEF DESCRIPTION OF THE DRAWINGS

FIG. 5 is an exemplary diagram of a front view of the fiber connector of FIGS. 4A and 4B;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide an arrangement for a fiber patch panel system that conserves horizontal space, manages fiber bending diameter, provides easy access to the fiber connectors, permits easy cleaning of both ends of the optical fibers, is scaleable, and/or permits easy installation of a splice tray or drawer.

Figure 1:
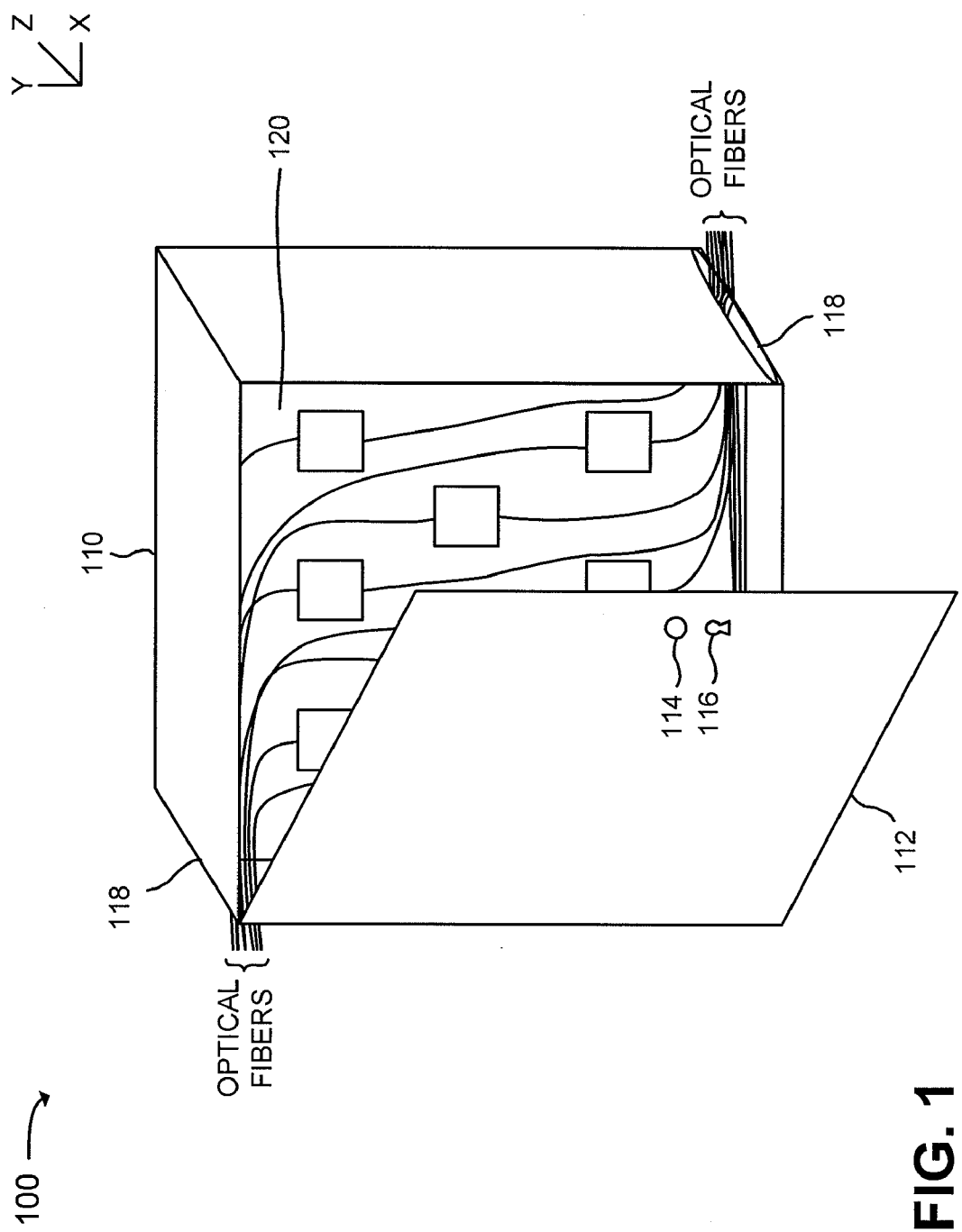
FIG. 1 is a diagram of an exemplary fiber patch panel system.

FIG. 1 is a diagram of an exemplary fiber patch panel system 100. Fiber patch panel system 100 may include a housing 110 and a patch panel 120. Housing 110 may be constructed of a rigid material, such as plastic or metal, to support and protect the components of fiber patch panel system 100. In one implementation, housing 110 may be mounted on a wall in the orientation shown in FIG. 1. With the architecture, as described herein, housing 110 can have a horizontal length that is approximately one-third of the horizontal length of existing fiber patch panel systems, while providing more optical fiber connections.

Housing 110 may include a door 112 that may provide access to the interior of housing 110. Door 112 may include a handle or knob 114 to facilitate opening of door 112. Door 112 may also include a lock 116 to restrict access to the interior of housing 110 to only authorized people.

Housing 110 may include a number of slots 118 through which optical fibers can pass from outside of housing 110 to inside of housing 110, and vice versa. While slots 118 are shown in FIG. 1 as being located at the top left and bottom right portions of the sides of housing 110, slots 118 can be located at other locations of housing 110. For example, slots 118 can be located at both the top and bottom portions of both sides of housing 110 to provide flexibility in the feeding of the optical fibers into and out of housing 110. Alternatively, or additionally, slots 118 can be located at both the top and bottom portions of a single side of housing 110. Alternatively, or additionally, slots 118 can be located elsewhere on one or more sides of housing 110. Alternatively, or additionally, slots 118 can be located on the top and/or bottom of housing 110.

Figure 2:
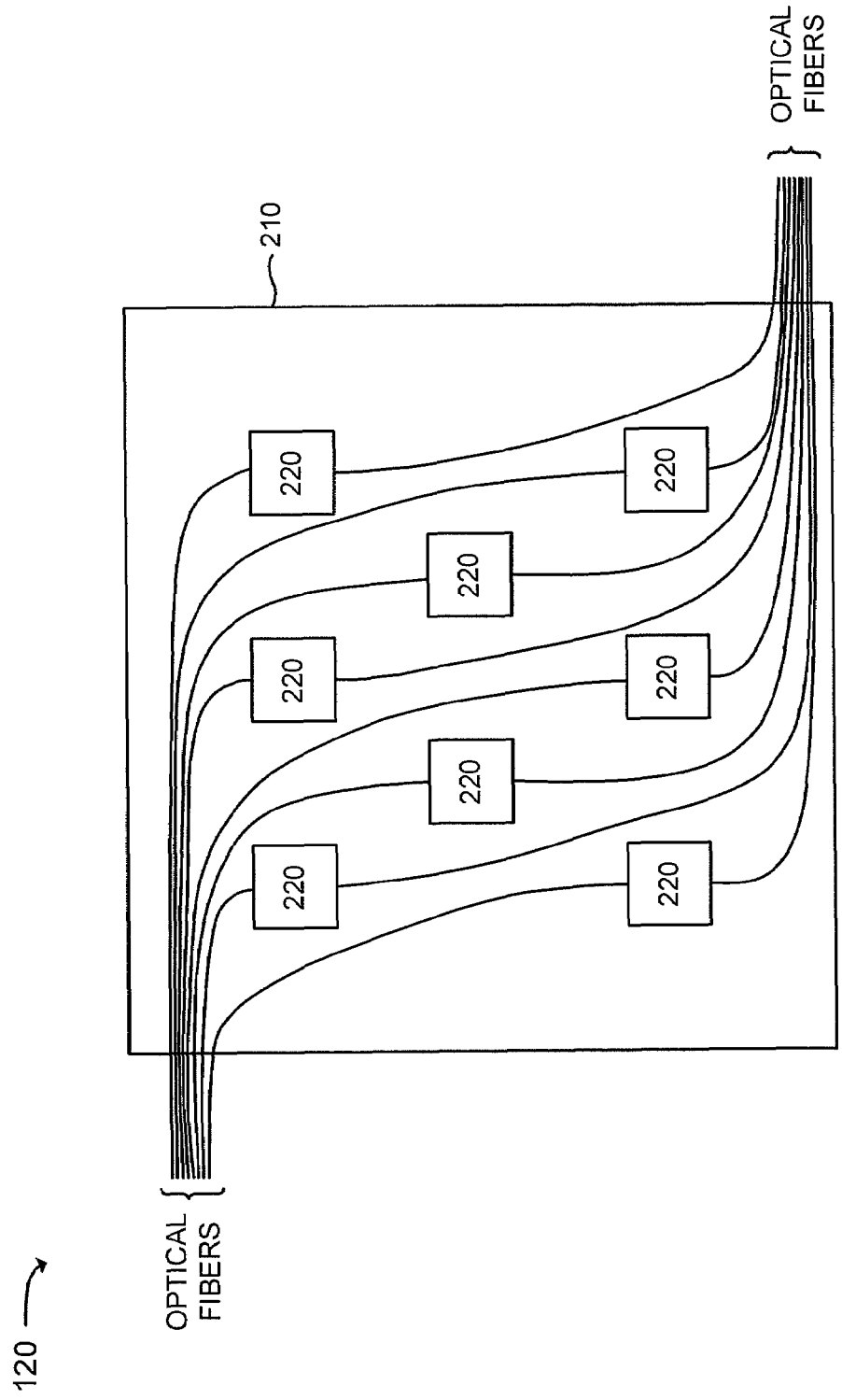
FIG. 2 is an exemplary diagram of a front view of a patch panel depicted in FIG. 1.

Patch panel 120 may securely attach to housing 110. Patch panel 120 may facilitate the connection of the optical fibers. FIG. 2 is an exemplary diagram of a front view of patch panel 120. Patch panel 120 may include a connection plate 210 and a matrix (e.g., a two dimensional array) of fiber connectors 220. While a certain number and arrangement of fiber connectors 220 are shown in FIG. 2, there may be a different number and/or arrangement of fiber connectors 220 in other implementations. To manage fiber bending and facilitate access to fiber connectors 220, fiber connectors 220 may be arranged in a staggered pattern on connection plate 210.

Optical fibers are very sensitive to bending. As the bending diameter of an optical fiber decreases, the power loss for the optical fiber increases. An increase in power loss may cause degradation in the quality of the signal transmitted on the optical fiber (e.g., video or data signal). For example, an optical fiber may be able to tolerate a bending diameter of 50 to 30 millimeters without much power loss. If the bending diameter becomes 20 millimeters (or even 10 to 5 millimeters), then the power loss may cause the signal quality to degrade significantly. Fiber connectors 220 may be arranged on connection plate 210, as shown in FIG. 2, to manage the bending of the optical fibers and keep such bending at a tolerable bending diameter.

Figure 3:
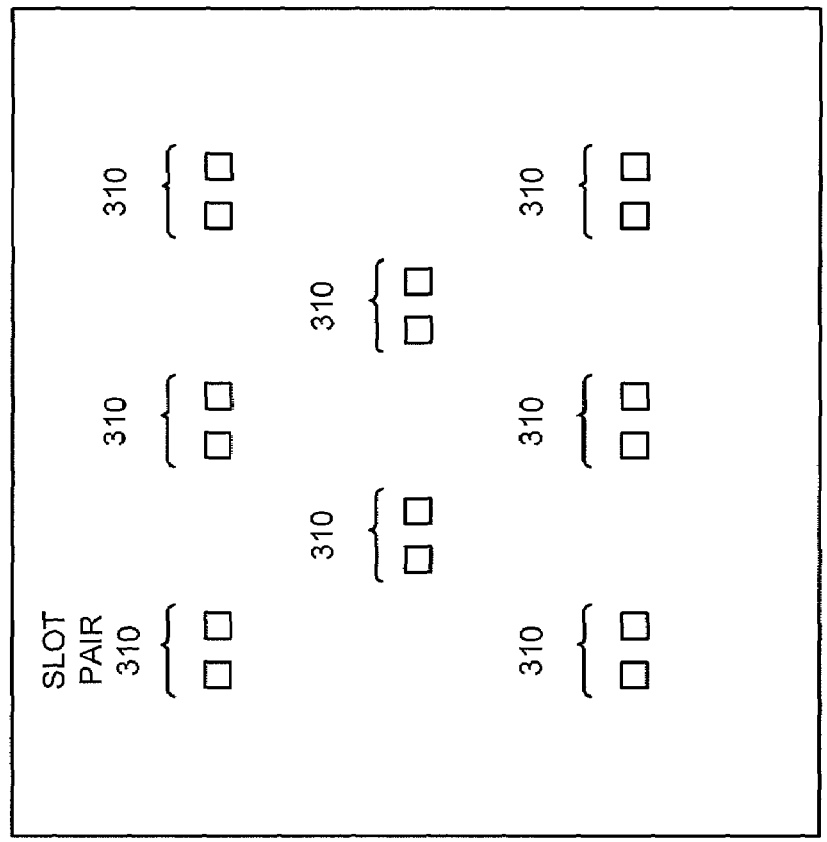
FIG. 3 is an exemplary diagram of a front view of a connection plate depicted in FIG. 2.

Connection plate 210 may securely hold fiber connectors 220. FIG. 3 is an exemplary diagram of a front view of connection plate 210. Connection plate 210 may be formed of a rigid material, such as plastic or metal. Connection plate 210 may include a number of slot pairs 310. Each slot pair 310 may include a pair of through-holes that may facilitate seating of fiber connectors 220. While a particular number and arrangement of slot pairs 310 are shown in FIG. 3, the number and arrangement of slot pairs 310 may differ in other implementations.

Returning to FIG. 2, fiber connectors 220 may be seated on connection plate 210. Each fiber connector 220 may mate two optical fibers in a vertical direction. As shown in FIG. 2, in one implementation, a fiber connector 220 may receive an optical fiber from a top side of connection plate 210 and may receive an optical fiber from a bottom side of connection plate 210.

Figure 4A:
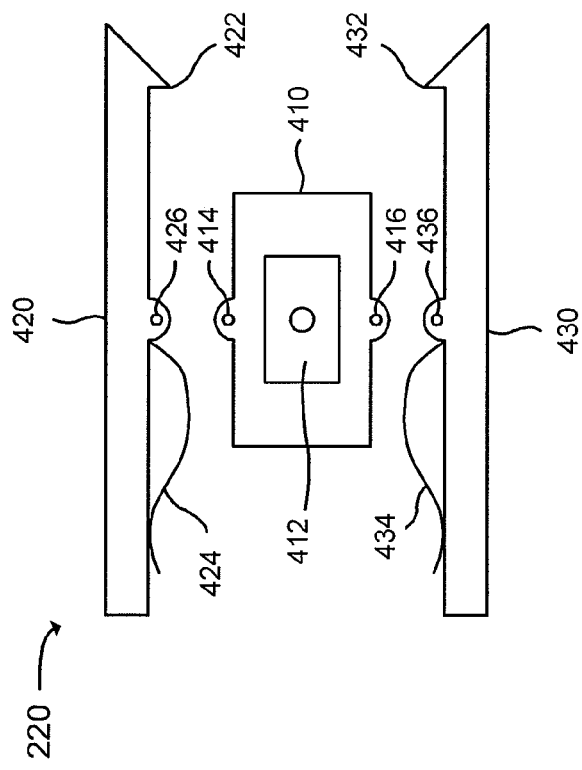
FIGS. 4A and 4B are exemplary diagrams of a fiber connector of FIG. 2.
Figure 4B:
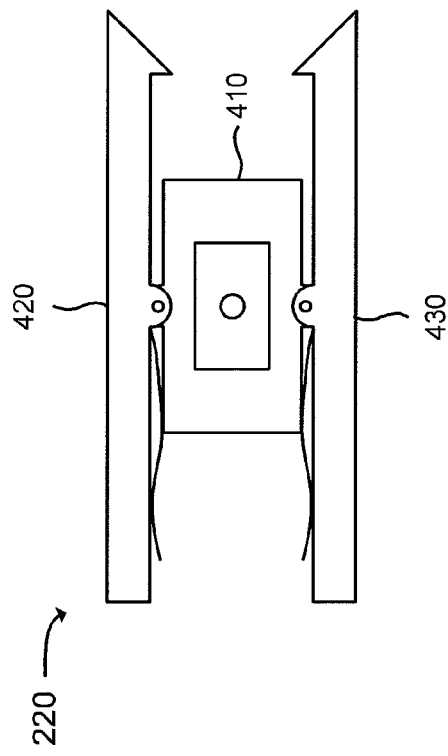

FIGS. 4A and 4B are exemplary diagrams of a fiber connector 220. FIG. 4A shows fiber connector 220 from a disassembled state, and FIG. 4B shows fiber connector 220 in an assembled state. While FIGS. 4A and 4B show a particular architecture for fiber connector 220, fiber connector 220 may include a different arrangement of elements in another implementation.

As shown in FIG. 4A, fiber connector 220 may include connector housing 410 and handlers 420 and 430. Connector housing 410 and handlers 420 and 430 may be formed of at least a semi-rigid material, such as plastic or rubber.

Connector housing 410 may include a port 412 to receive an optical fiber. Connector housing 410 may include a corresponding port (not shown in FIG. 4A) on the opposite side of connector housing 410 to receive another optical fiber. The pair of ports may be used to connect (mate) two optical fibers together. Connector housing 410 may also include a pair of pin holes 414 and 416. Each of pin holes 414 and 416 may include a hole that is capable of receiving a joint pin or the like.

Handler 420 may include a tip 422, a spring 424, and a pin hole 426. Tip 422 may be shaped to be inserted into a slot of a slot pair 310 of connection plate 210 and securely hold fiber connector 220 against connection plate 210 if fiber connector 220 is seated. As shown in FIG. 4A, tip 422 may include an angular protrusion portion. In another implementation, tip 422 may be differently shaped.

Spring 424 may include a flexible, elastic material that is capable of storing mechanical energy. Pin hole 426 may include a hole that is shaped to mate with pin hole 414 of connector housing 410. Pin holes 414 and 426 may be fastened together via a joint pin or the like. The joint pin may rotatably connect handler 420 to connector housing 410.

Handler 430 may include a tip 432, a spring 434, and a pin hole 436. Tip 432 may be shaped to be inserted into a slot of a slot pair 310 of connection plate 210 and securely hold fiber connector 220 against connection plate 210 when fiber connector 220 is seated. As shown in FIG. 4A, tip 432 may include an angular protrusion portion. In another implementation, tip 432 may be differently shaped.

Spring 434 may include a flexible, elastic material that is capable of storing mechanical energy. Pin hole 436 may include a hole that is shaped to mate with pin hole 416 of connector housing 410. Pin holes 416 and 436 may be fastened together via a joint pin or the like. The joint pin may rotatably connect handler 430 to connector housing 410.

As shown in FIG. 4B, when connector housing 410, handler 420, and handler 430 are fastened together, springs 424 and 434 may exert a force against connector housing 410 to push the left hand side of fiber connector 220 outward and the right hand side of fiber connector 220 inward, similar to a wooden clothespin. The terms "left hand side" and "right hand side" are intended to be relative to the orientation of fiber connector 220 shown in the figures.

FIG. 5 is an exemplary diagram of a front view of fiber connector 220. The front view shows the manner in which fiber connector 220 may be positioned if seated on connection plate 210. As shown in FIG. 5, two optical fibers may connect to connector housing 410 in a vertical direction. With such an arrangement, fiber connector 220 may have a low profile if seated on connection plate 210. Unlike a horizontal connection where gravity causes the optical fibers to bend toward the ground, no such bending occurs in a vertical connection.

Figure 6A:
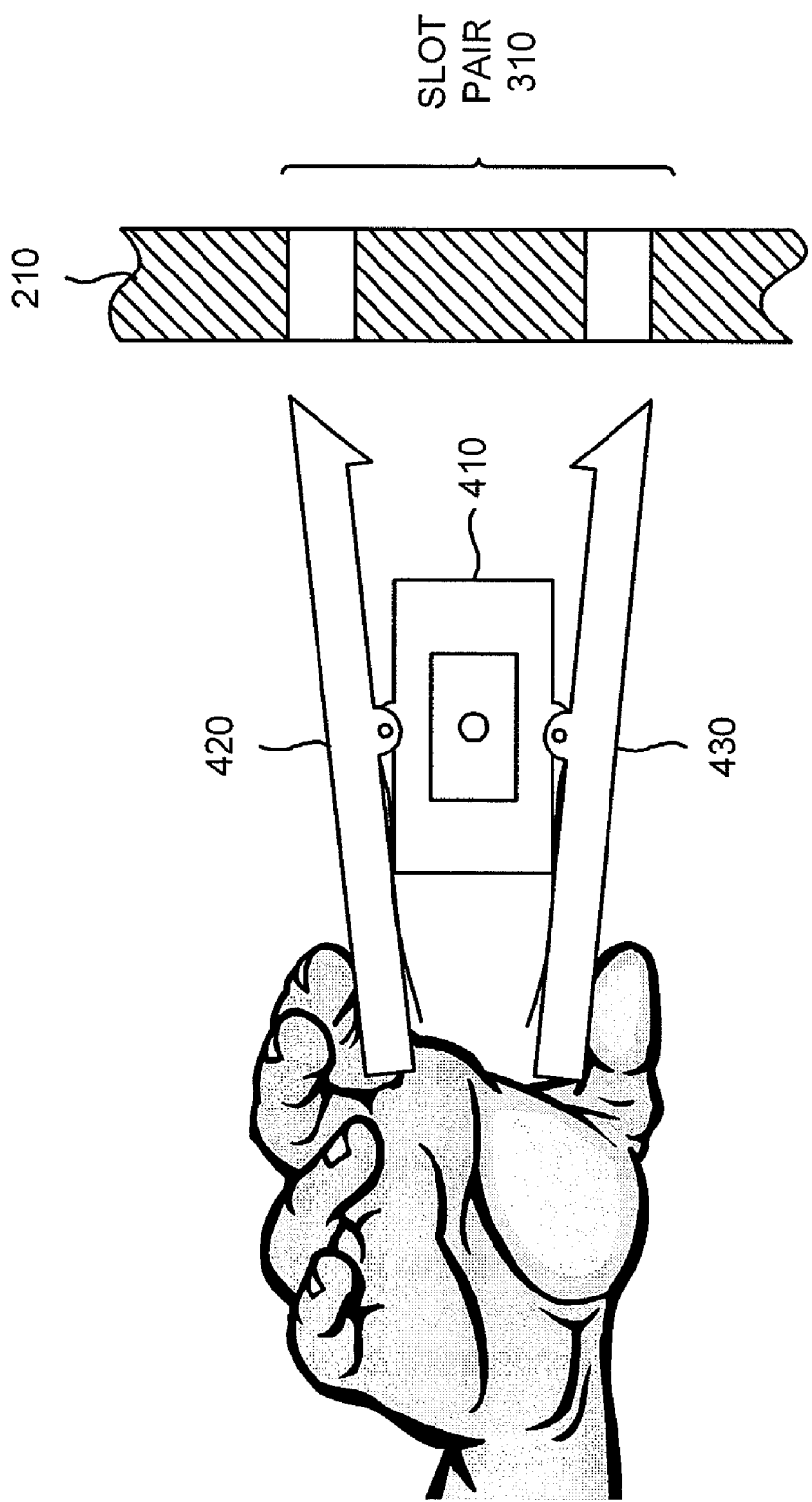
FIGS. 6A and 6B are exemplary diagrams illustrating the seating of a fiber connector on a connection plate.
Figure 6B:
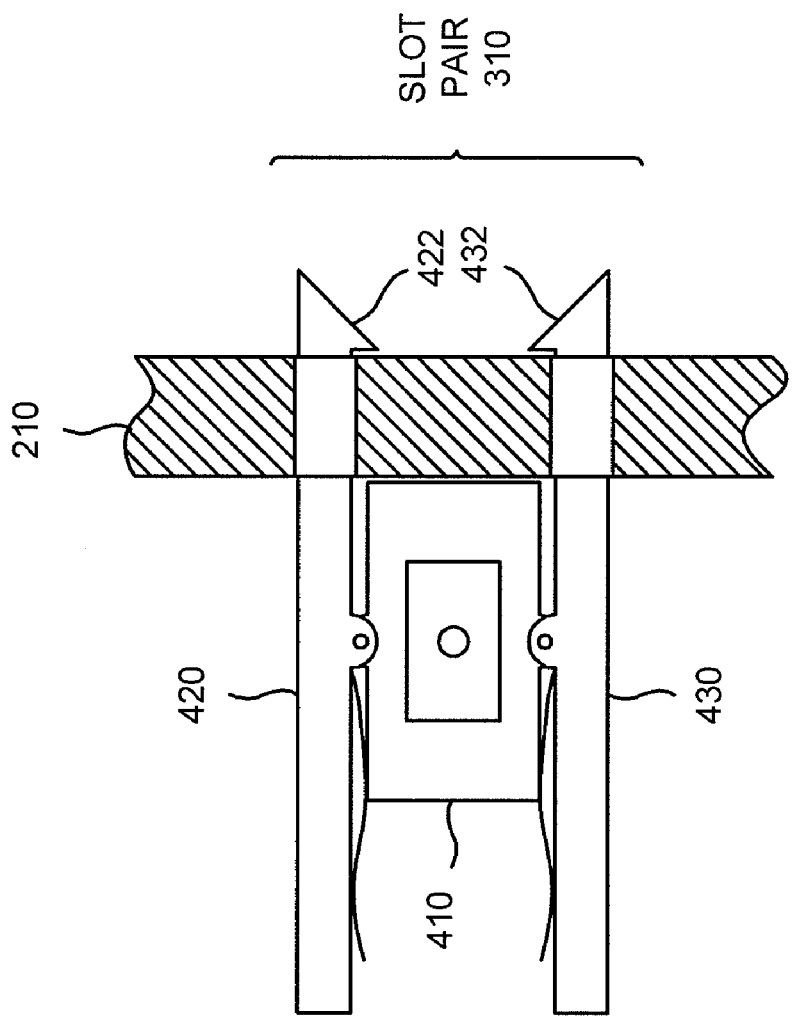

FIGS. 6A and 6B are exemplary diagrams illustrating the seating of fiber connector 220 on connection plate 210. As shown in FIG. 6A, a user may press the left hand side of handlers 420 and 430 together. This may cause the right hand side of handlers 420 and 430 to separate. The user may then insert the right hand side of handlers 420 and 430 into a slot pair 310 of connection plate 210.

As shown in FIG. 6B, the user may insert the right hand side of handlers 420 and 430 until tips 422 and 432 fully pass through connection plate 210. The user may then release the left hand side of handlers 420 and 430. Springs 424 and 434 may exert a force against connector housing 410 to push the left hand side of fiber connector 220 outward and the right hand side of fiber connector 220 inward, thereby securely seating fiber connector 220 to connection plate 210 via the through-holes of slot pair 310. The angular protrusion portions of tips 422 and 432 may prevent fiber connector 220 from becoming unseated from connection plate 210.

Fiber connector 220 may, thus, permit easy access to the optical fibers and permit both ends of the optical fibers to be cleaned. For example, a user may simply press the left hand side of handlers 420 and 430 together. This may cause the right hand side of handlers 420 and 430 to separate. The user may then remove the right hand side of handlers 420 and 430 from a slot pair 310 of connection plate 210 without disturbing any of the other fiber connectors 220. The user may then remove the optical fibers from connector housing 410 and clean them. The user may re-insert the cleaned optical fibers into connector housing 410 and re-seat fiber connector 220 to connection plate 210, as described above.

Figure 7:
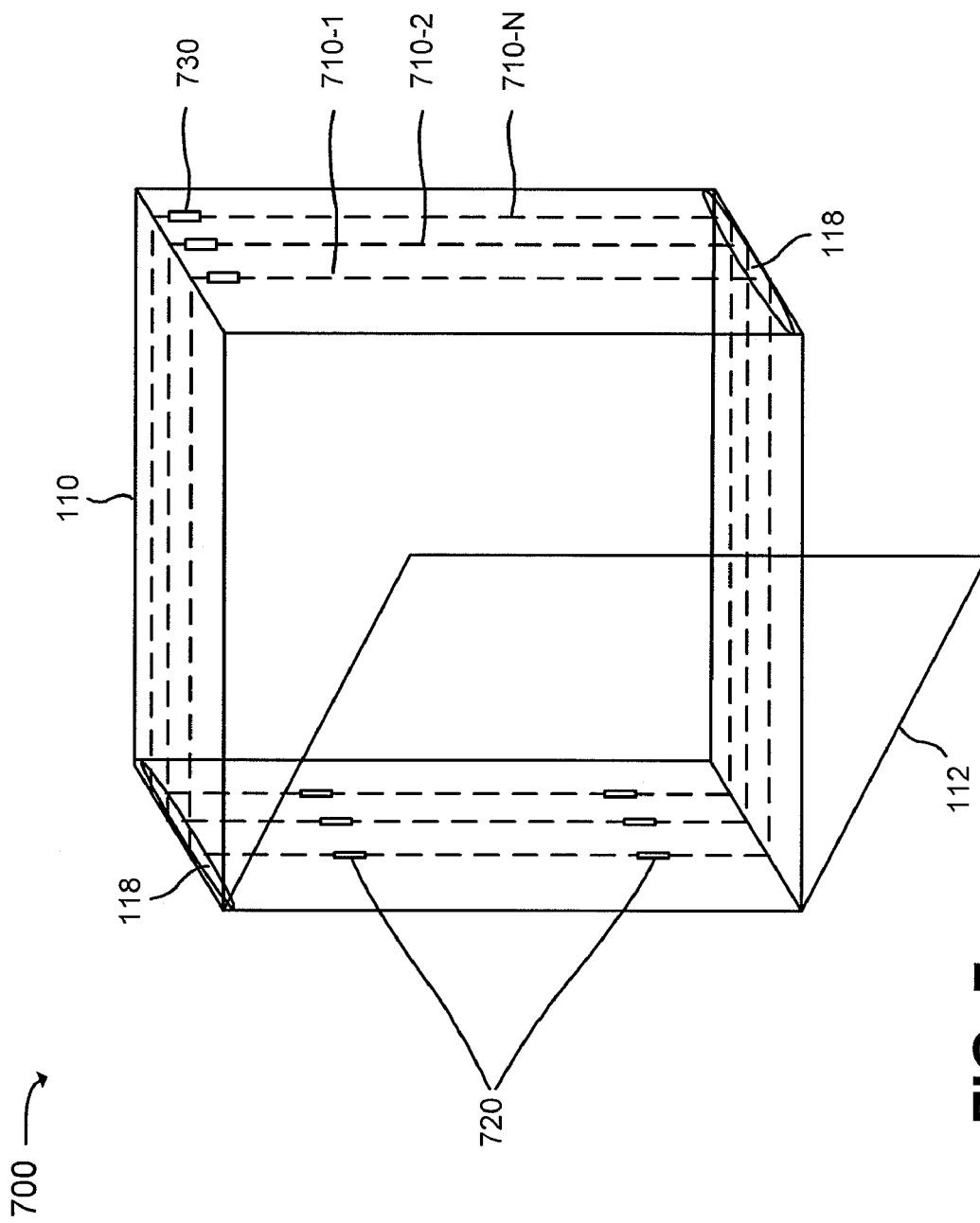
FIG. 7 is an exemplary diagram of a scaleable fiber patch panel system.

FIG. 7 is an exemplary diagram of a scaleable fiber patch panel system 700. Fiber patch panel system 700 may include a housing 110 that includes a door 112 and a number of slots 118, as described above with regard to fiber patch panel system 100 of FIG. 1. Unlike fiber patch panel system 100, however, fiber patch panel system 700 may include a number of patch panels 710-1, 710-2, . . . , 710-N (where N>1) (collectively referred to as "patch panels 710"). Each of patch panels 710 may be similar to patch panel 120. For example, each of patch panels 710 may include a connection plate 210 and a set of fiber connectors 220.

Patch panels 710 may be rotatably connected to housing 110 via a set of hinges 720. A hinge 720 may include any mechanical mechanism that permits a patch panel 710 to fixedly attach to housing 110 while permitting patch panel 710 to rotate toward door 112 ("open position") and/or away from door 112 ("closed position"). For example, patch panel 710-1 may rotate outwards (toward door 112) exposing patch panel 710-2; patch panel 710-2 may rotate outwards exposing patch panel 710-3; and so forth. Each of patch panels 710 may include a mechanism to permit a user to grab and rotate patch panel 710, such as a handle, an opening, or the like. In one implementation, the last patch panel (i.e., patch panel 710-N) may not be rotatably connected to housing 110 and need not include a hinge 720.

Patch panels 710 and/or housing 110 may include a stabilizing mechanism 730 (e.g., one or more stoppers and/or magnets) to secure patch panels 710 at the closed position within housing 110. In one implementation, the last patch panel (i.e., patch panel 710-N) may not include a stabilizing mechanism 730.

Fiber patch panel system 700 may be scaleable in the sense that as many layers of patch panels 710 may be included within housing 110 as needed. Each additional patch panel 710 may add a number of fiber connectors 220 and, thus, a number of potential fiber optic connections.

Figure 8:
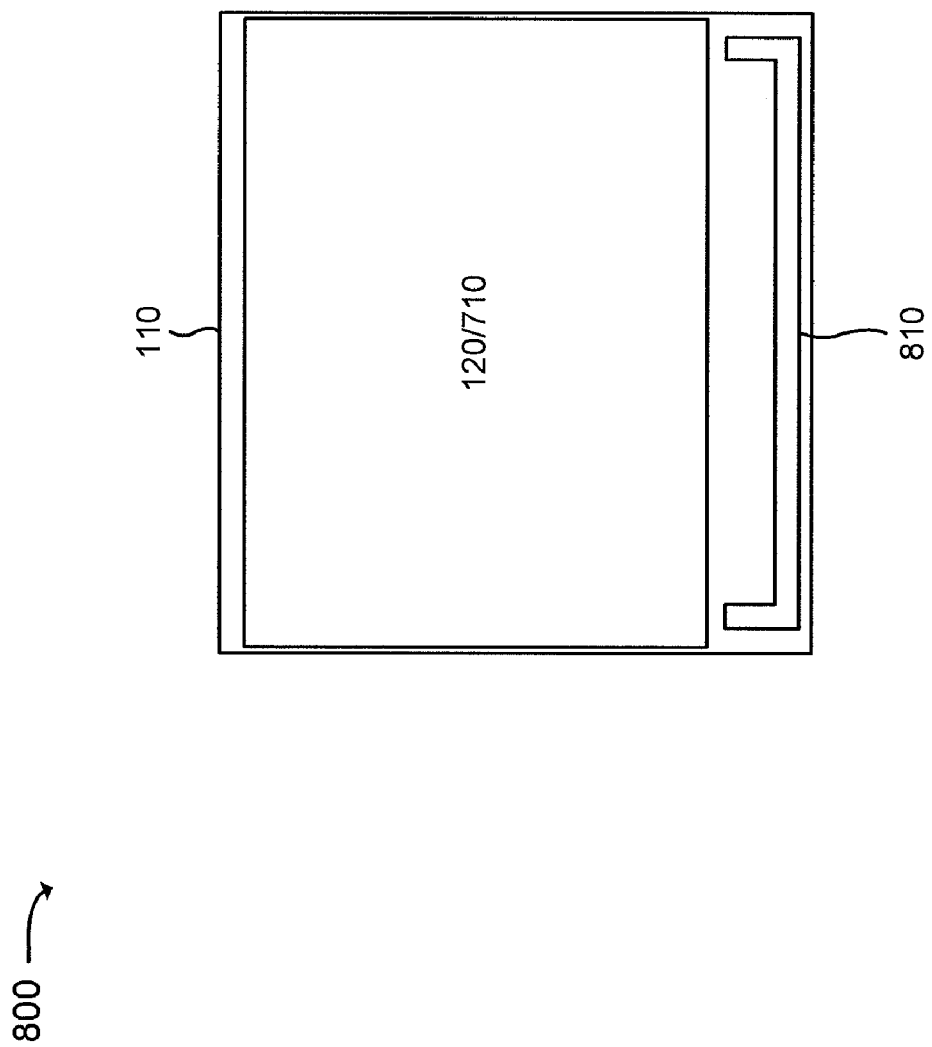
FIG. 8 is an exemplary diagram of a fiber patch panel system that includes a splice tray or drawer.

FIG. 8 is an exemplary diagram of a fiber patch panel system 800 that includes a splice tray or drawer (referred to as a "splice tray/drawer" 810). Fiber patch panel system 800 may include housing 110 and patch panel 120/710, as described above with regard to fiber patch panel system 100 of FIG. 1 or fiber patch panel system 700 of FIG. 7. In this case, however, patch panel 120/710 may occupy a vertical space less than the vertical space of housing 110 to leave an area for splice tray/drawer 810. Splice tray/drawer 810 may be used to hold one or more pairs of spliced fibers. Splice tray/drawer 810 may be inserted into housing 110 to reside on a bottom (or floor) of housing 110. This may make it easy to install and remove splice tray/drawer 810 as necessary. In another implementation, multiple splice trays or drawers 810 may be used within the bottom area of housing 110.

Implementations described herein may provide an arrangement for a fiber patch panel system that conserves horizontal space, is scaleable, manages fiber bending, provides easy access to optical fibers for insertion, removal, and/or cleaning, and/or permits easy installation and removal of a splice tray or drawer.

The foregoing description provides illustration and description, but is not intended to be exhaustive or to limit the invention to the precise form disclosed. Modifications and variations are possible in light of the above teachings or may be acquired from practice of the invention.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A system, comprising:
   a housing; and
   a plurality of patch panels located within the housing, each of the plurality of patch panels comprising:
      a connection plate including a matrix of slot pairs, each of the slot pairs including two through-holes, and
      a matrix of fiber connectors connected to the connection plate, where one of the fiber connectors includes:
         a connector housing to receive and mate two optical fibers in a vertical direction,
         a first handler connected to a first side of the connector housing, and associated with a first spring to apply force to the first side of the connector housing, and
         a second handler connected to a second side of the connector housing, and associated with a second spring to apply force to the second side of the connector housing, where
         a portion of the one fiber connector is to be inserted through the connection plate via the two through-holes, and, where
   a first one of the plurality of patch panels rotatably connects to the housing and is rotatable to a first position that conceals a second one of the patch panels and is rotatable to a second position that exposes the second one of the plurality of patch panels.

2. The system of claim 1, where each of the first handler and the second handler includes:
   a tip to be inserted through the connection plate and securely seat the one of the fiber connectors to the connection plate.

3. The system of claim 1, where each of the plurality of patch panels has a vertical length that is smaller than a vertical length of the housing to create a free space in the housing.

4. The system of claim 3, further comprising:
   a splice tray or drawer to occupy the free space in the housing.

5. A patch panel, comprising:
   a connection plate; and
   a matrix of fiber connectors connected to the connection plate and arranged to receive optical fibers in a vertical direction, where at least one of the fiber connectors further includes:
      a connector housing to mate two optical fibers,
      a spring-biased first handler connected to a first side of the connector housing, where a first spring biasing the first handler is to apply force to the first side of the connector housing, and
      a spring-biased second handler connected to a second side of the connector housing, where a second spring biasing the second handler is to apply force to the second side of the connector housing.

6. The patch panel of claim 5, where the connection plate includes a matrix of slot pairs, each of the slot pairs including two through-holes.

7. The patch panel of claim 6, where the at least one of the fiber connectors includes a portion to be inserted through the connection plate via the two through-holes.

8. The patch panel of claim 5, where each of the first handler and the second handler includes:
   a tip to be inserted through the connection plate and securely seat the one of the fiber connectors to the connection plate.

9. A fiber connector, comprising:
   a connector housing to mate two optical fibers;
   a first handler connected to a first side of the connector housing, the first handler including a first spring to apply force to the first side of the connector housing; and
   a second handler connected to a second, opposite side of the connector housing, the second handler including a second spring to apply force to the second side of the connector housing, where
   the first handler and the second handler connect to the connector housing so that when a first end of the first handler and the second handler are pressed together, a second end of the first handler and the second handler separate apart.

10. The fiber connector of claim 9, where each of the first handler and the second handler includes:
    a tip to be inserted through a connection plate and securely seat the fiber connector to the connection plate.

11. The fiber connector of claim 10, where the tip includes an angular protrusion portion.

12. A system, comprising:
    a housing;
    a first patch panel rotatably connected to the housing comprising:
       a first connection plate including a first matrix of slot pairs, each of the first slot pairs including a first set of two through-holes, rotatably connected to the housing, and
       a first matrix of first fiber connectors connected to the first connection plate, where one of the first fiber connectors includes:
          a first connector housing to receive and mate a first set of optical fibers in a vertical direction,
          a first handler, connected to a first side of the first connector housing, and associated with a first spring to apply force to the first side of the first connector housing, and
          a second handler, connected to a second side of the first connector housing, and associated with a second spring to apply force to the second side of the first connector housing, where
          a first portion of the one of the first fiber connectors is to be inserted through the first connection plate via the first set of two through-holes; and
    a second patch panel comprising:
       a second connection plate, including a second matrix of second slot pairs, each of the second slot pairs including a second set of two through-holes, connected to the housing, and
       a second matrix of second fiber connectors connected to the second connection plate, where one of the second fiber connectors includes:

a second connector housing to receive and mate a second set of optical fibers in a vertical direction,
a third handler, connected to a first side of the second connector housing, and associated with a first spring to apply force to the first side of the first connector housing, and
a fourth handler, connected to a second side of the second connector housing, and associated with a second spring to apply force to the second side of the second connector housing, where
a first portion of the one of the second fiber connectors is to be inserted through the second connection plate via the second set of two through-holes.

* * * * *